(12) United States Patent
Nojima

(10) Patent No.: US 8,098,414 B2
(45) Date of Patent: Jan. 17, 2012

(54) SCANNING IMAGE DISPLAY SYSTEM AND SCANNING IMAGE DISPLAY

(75) Inventor: Shigeo Nojima, Suwa (JP)

(73) Assignee: Seiko Epson Corporation, Toyko (JP)

( * ) Notice: Subject to any disclaimer, the term of this patent is extended or adjusted under 35 U.S.C. 154(b) by 586 days.

(21) Appl. No.: 12/326,744

(22) Filed: Dec. 2, 2008

(65) Prior Publication Data

US 2009/0141192 A1 Jun. 4, 2009

(30) Foreign Application Priority Data

Dec. 3, 2007 (JP) ................................. 2007-312644

(51) Int. Cl.
*G02B 26/08* (2006.01)

(52) U.S. Cl. ............... 359/202.1; 359/204.1; 359/213.1; 359/224.1; 345/9

(58) Field of Classification Search .... 359/201.1–204.5, 359/213.1–215.1, 223.1–224.2; 345/7, 9, 345/30, 32

See application file for complete search history.

(56) References Cited

U.S. PATENT DOCUMENTS

| 5,225,923 A * | 7/1993 | Montagu ................... 359/199.1 |
| 2003/0072066 A1* | 4/2003 | Hayashi et al. ............... 359/201 |
| 2007/0070483 A1* | 3/2007 | Ishihara et al. ............... 359/213 |

FOREIGN PATENT DOCUMENTS

| JP | 01-228281 | 9/1989 |
| JP | 01-245780 | 9/1989 |
| JP | 03-075685 | 3/1991 |

* cited by examiner

*Primary Examiner* — James Phan
(74) *Attorney, Agent, or Firm* — Maschoff Gilmore & Israelsen

(57) ABSTRACT

A scanning image display system which includes a plurality of scanning image displays each including a light source adapted to emit a laser beam, and a scan unit having a first scan section adapted to scan the laser beam emitted from the light source in a first direction on a projection surface, and a second scan section adapted to scan the laser beam in a second direction substantially perpendicular to the first direction. The first scan sections are resonant scan sections which are faster than the second scan sections in scan speed. The first scan sections are heated with light during the time that an image is formed and a reset period of the second scan sections in order to control resonant frequencies of the first scan sections.

19 Claims, 6 Drawing Sheets

SCANNING IMAGE DISPLAY SYSTEM AND SCANNING IMAGE DISPLAY

The entire disclosures of Japanese Patent Application No. 2007-312644, filed Dec. 3, 2007 is expressly incorporated herein by reference.

BACKGROUND OF THE INVENTION

1. Technical Field

The present invention relates to a scanning image display system and a scanning image display.

2. Related Art

In recent years, scanning image displays have been adapted so as to display an image by raster-scanning a light beam such as a laser beam on a projection surface.

In order to generate an image using the scanning image display, it is necessary to scan a light beam two-dimensionally using a scanner such as a polygon mirror or a galvanometer mirror. Although a two-dimensional method of scanning a light beam can be used where a single scanner scans in both the horizontal and vertical directions, the resulting scanner is more complicated and difficult to control. Therefore, scanning image displays are typically provided with two sets of scanners, each of which scans along one dimension using a single light beam. Thus one light beam scans in the horizontal direction and one scans in the vertical direction. In the past, it has been common to use polygon mirrors or galvanometer mirrors in each of the scanners, and a projection device using rotating polygon mirrors for both of the scanners has been proposed (see e.g., Japanese Patent Application No. JP-A-1-245780).

Further, in recent years, there is proposed a technology which uses a plurality of projectors to form a large screen by projecting a plurality of projection images respectively projected from a plurality of projectors onto a screen in a tiling manner, (see Japanese Patent Application Nos. JP-A-1-228281 and JP-A-3-75685). As described above, there has been proposed a method of projecting the same display images on a screen in an overlapping manner, thereby achieving higher luminance of the image, correcting a luminance variation of the image, and enhancing color expression (enlarging the color reproduction area), thus increasing the number of gray-scales and the resolution.

The multi-projection television described in the JP-A-1-228281 combines projection televisions with the same structure by coupling the televisions together in the vertical and horizontal directions via a coupling member. Thus, since the projection televisions located in an upper part with the coupling member can be moved in an anteroposterior direction, the seam between the front surfaces of the screen can be reduced to the minimum.

The projecting image display described in the JP-A-3-75685 is provided with a plurality of projectors, which display divisional images by dividing the image to be projected on the liquid crystal panels of the projectors, respectively, and enlarging and projecting the divisional images on a screen, so that the images are displayed adjacent to each other, thereby displaying the entire image. In this case, the liquid crystal pixels and the screen pixels on the screen correspond one-to-one, and that the intervals of the screen pixels are equal. Therefore, since the positions of the liquid crystal pixels for displaying the image are always fixed on the screen, it becomes possible to obtain a large-sized image in which the boundaries between the adjacent images of the respective projectors are not visible.

However, although a polygon mirror, a galvanometer mirror, an MEMS mirror (a resonant mirror) an acousto-optic (AO) element, an electro-optic (EO) element, and as the like may be used as the scanner scanning the image display, an MEMS mirror is preferable as the scanner for satisfying the both requirements of a large-sized screen (a large deflection angle of the scanner) and high resolution (high-speed driving, and a large area of the mirror).

However, one difficultly with using the MEMS mirror, however, is that the MEMS mirror utilizes resonance of the system in order for obtaining a large deflection angle, meaning that if the drive frequency of the MEMS mirror is shifted from the resonant frequency, it is difficult to achieve a large deflection angle as desired. Since the resonant frequency of the MEMS mirror varies depending on absorption of the heat of the laser beam and the ambient temperature, in the case of scanning the MEMS mirror at a high speed, it is necessary to vary the drive frequency to correspond with variations in the resonant frequency.

However, if the heat is accumulated in the MEMS mirror, the resonant frequency of the MEMS mirror is lowered, and if the drive frequency of the MEMS mirror is set lower than a certain level, there is insufficient time to draw one frame and the frame is dropped.

Further, in the scanning image display system adapted to use a plurality of scanning image displays using the MEMS mirrors to perform display by arranging the images formed by the respective scanning image displays, since the plurality of MEMS mirrors operate at respective resonant frequencies, it is difficult to synchronize all the MEMS mirrors of the respective scanning image displays. This is caused by the characteristic that the heat accumulation of the MEMS mirror causes the resonant frequency thereof to be lower as described above. Therefore, when a substantial amount of heat is accumulated in the MEMS mirror, dropped frames may result, causing a flicker in the resulting image.

BRIEF SUMMARY OF THE INVENTION

The invention has an advantage of solving the problems described above, thus providing a scanning image display system and a scanning image display capable of preventing dropped frames and flickers, thereby displaying a crisp image.

In order for obtaining the above advantage, the invention provides the following measures.

A first aspect of the invention is a scanning image display system comprising a plurality of scanning image displays. Each scanning image display comprises a light source adapted to emit a laser beam and a scan unit having a first scan section comprising resonant scan sections capable of scanning the laser beam emitted from the light source in a first direction on a projection surface and a second scan section capable of scanning the laser beam in a second direction substantially perpendicular to the first direction, the first scan section being capable of scanning faster than the second scan sections. The first scan sections are heated with light in order to control the resonant frequencies of the first scan sections during at least a part of the period of time comprising an image forming period and a reset period of the second scan sections.

The scanning image display system according to the aspect of the invention heats the plurality of first scan sections with the light in at least a part of the scan period and the reset period of the respective second scan sections. Specifically, for example, by heating the first scan section having shorter imaging time and therefore smaller amount of accumulated heat with the light, the resonant frequency of the first scan section can be lowered. Since the scan rate of each of the first scan sections can be adjusted by thus controlling the resonant frequency of each of the plurality of first scan sections, a crisp image can be displayed on the projection surface while preventing the drop frame and the flicker from occurring.

Further, since the scanning image display using the laser beam is adopted, there is caused a small variation in wavelength between the laser beams emitted from the light sources of the respective scanning image displays. Thus, even in the case where side-by-side images displayed by the respective scanning image displays, it becomes possible to display a crisp image without creating a noticeable seam between the. Further, since the image is displayed with one laser beam, the luminance variation can be reduced compared to the case of using liquid crystal light valves. Further, since the black level can be set to zero in principle with laser beams, it becomes possible to blend the adjacent edges of the images with good accuracy.

A second aspect of the invention comprises a scanning image display comprising a light source adapted to emit a laser beam and a scan unit. The scan unit comprises a first scan section comprising a resonant scan section with is capable of scanning the laser beam emitted from the light source in a first direction on a projection surface, and a second scan section capable of scanning the laser beam in a second direction substantially perpendicular to the first direction, the first scan section being capable of scanning faster than the second scan sections. The first scan section is heated with light during at least a part of the period of time that the scanning is being performed by the second scan period and a reset period when scanning is not being performed by the second scan period so as to control the resonant frequency of the first scan section.

A third aspect of the invention is a scan unit comprising a first scan section comprising resonant scan sections capable of scanning a laser beam emitted from a light source in a first direction on a projection surface; and a second scan section capable of scanning the laser beam in a second direction substantially perpendicular to the first direction, the first scan section being capable of scanning faster than the second scan sections. The first scan sections are heated with light in order to control the resonant frequencies of the first scan sections during at least a part of the period of time comprising an image forming period and a reset period of the second scan sections.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Figure 1:
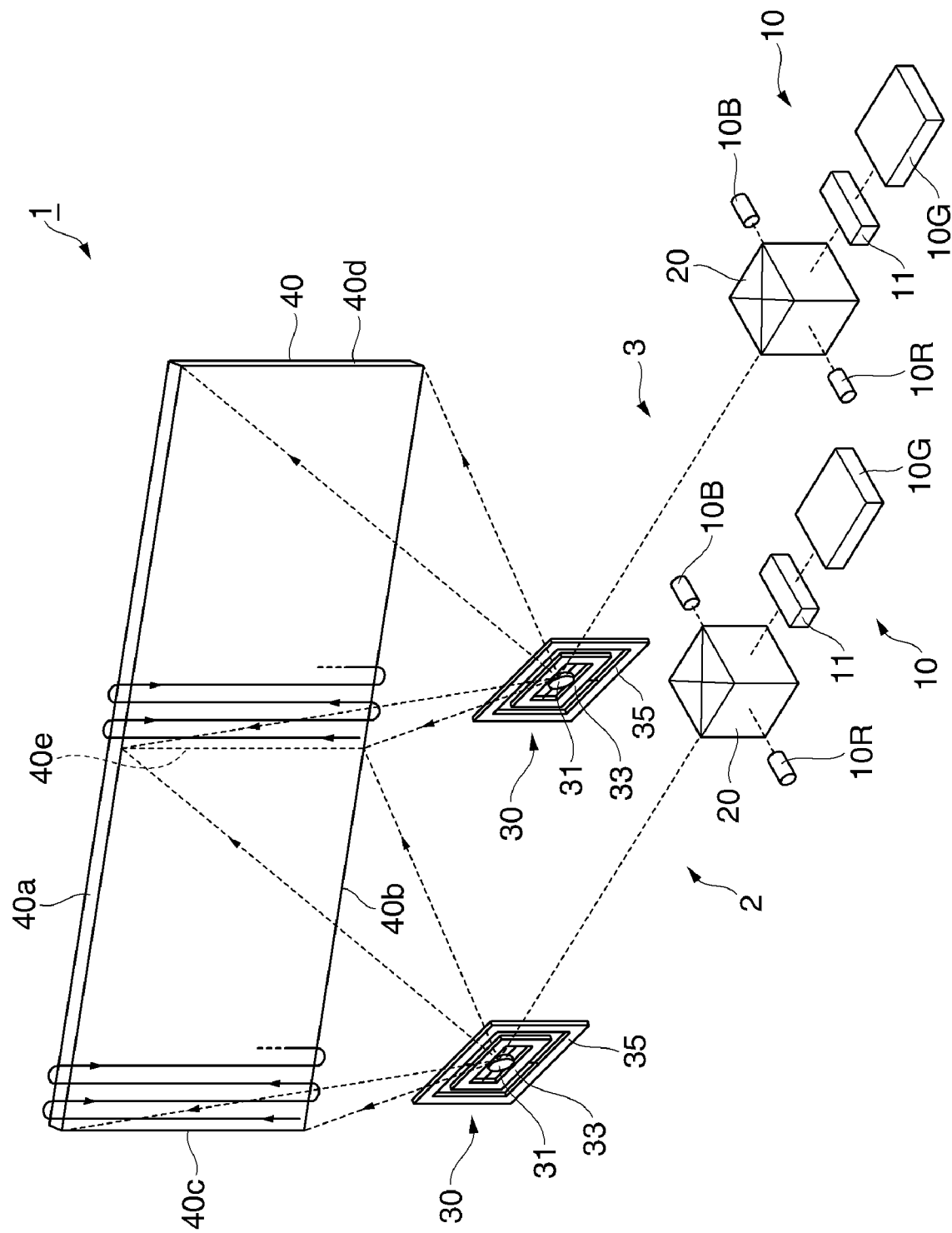
FIG. 1 is a perspective view showing a scanning image display system according to a first embodiment of the invention.

Hereinafter, the scanning image display systems and the scanning image displays according to some embodiments of the invention will be explained with reference to the accompanying drawings. It should be noted that the scale size of each member is accordingly altered so that the member is shown large enough to be recognized in the drawings below.

First Embodiment

As shown in FIG. 1, the scanning image display system 1 according to the present embodiment is provided with two scanning image displays 2 and 3. Since the scanning image displays 2 and 3 have the same configuration, the scanning image display 2 will hereinafter be explained.

The scanning image display 2 is a device provided with a light source 10, a cross dichroic prism 20, and an MEMS mirror 30, and adapted to display an image by scanning a laser beam reflected by the MEMS mirror 30 towards a screen 40.

The light source 10 is provided with a red light source 10R for emitting a red laser beam, a green light source 10G for emitting a green laser beam, a blue light source 10B for emitting a blue laser beam, and an acousto-optic modulator (AOM) 11.

The red light source 10R is a semiconductor laser (LD) for emitting a red laser beam with a center wavelength of 630 nm, and the blue light source 10B is a semiconductor laser (LD) for emitting a blue laser beam with a center wavelength of 430 nm. The green light source 10G is formed of a diode-pumped solid state (DPSS) laser, and the output thereof is converted by a wavelength converter, not shown, into a laser beam with a center wavelength of 540 nm.

Further, the AOM 11 is disposed between the green light source 10G and the cross dichroic prism 20. The AOM 11 is disposed so that the laser beam emitted from the green light source 10G is transmitted through the AOM 11. Further, when a high-frequency signal is input to the AOM 11, an ultrasonic wave corresponding to the high-frequency signal is propagated therein to exert an acousto-optic effect on the laser beam as it is transmitted through the AOM 11. The acousto-optic effect causes diffraction, thus the laser beam with an amount of light (intensity) corresponding to the high-frequency signal thus input is emitted from the AOM 11 as a diffracted light beam.

It should be noted that the configuration of the light source 10 is not limited thereto.

Figure 2:
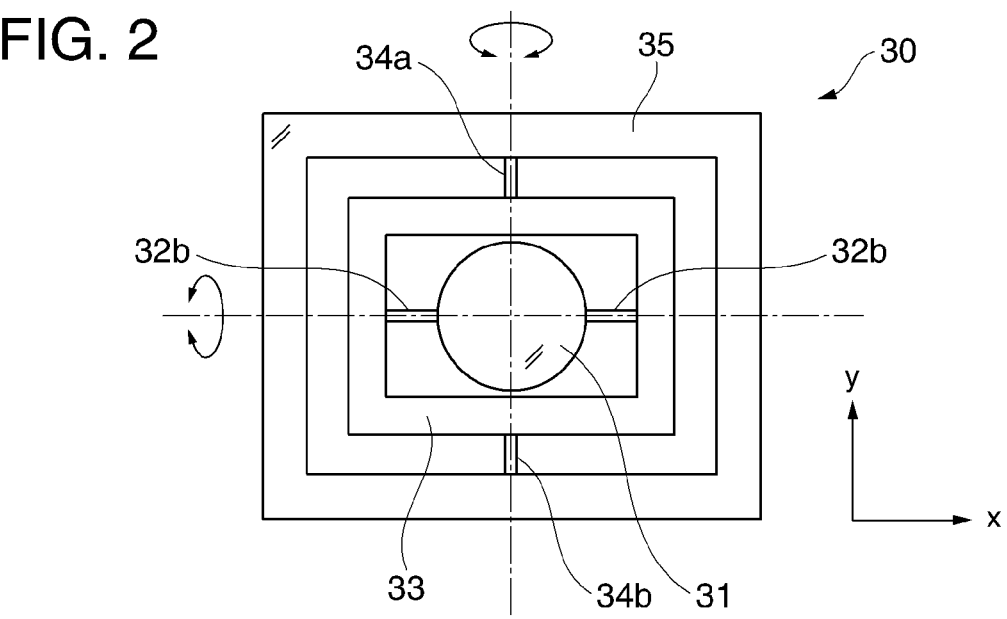
FIG. 2 is a plan view showing an MEMS mirror used for the scanning image display system shown in FIG. 1.

As shown in FIG. 2, the MEMS mirror 30 is a resonant mirror provided with a mirror section 31 (a first scan section), beams 32a, 32b, a first substrate (a second scan section) 33, beams 34a, 34b, and a section substrate 35.

The mirror section 31 is disposed at a center part of the MEMS mirror 30, and reflects the incident laser beam towards the screen 40. The beams 32a, 32b are disposed on both sides of the mirror section 31 so as to extend in a horizontal direction (an X-axis direction, a first direction) in the screen 40.

Further, the first substrate 33 has a frame like shape surrounding the mirror section 31, and is coupled to the beams 32a, 32b. The beams 34a, 34b are disposed on both sides of the first substrate 33 so as to extend in a vertical direction (a Y-axis direction, a second direction) in the screen 40.

Further, the second substrate 35 has a frame like shape surrounding the first substrate 33, and is coupled to the beams 34a, 34b.

According to these configurations, the mirror section 31 is able to rotate with respect to the first substrate 33 using the beams 32a, 32b as a rotation axis, and to allow the first substrate 33 to rotate with respect to the second substrate 35 using the beams 34a, 34b as a rotation axis. Therefore, the MEMS mirror 30 is arranged to be capable of biaxial-rotation around the X-axis and the Y-axis, so as to scan the laser beam in the horizontal direction and the vertical direction of the screen 40.

Therefore, by rotating the mirror section 31 around the X-axis with the beams 32a, 32b, the resonant frequency of the mirror section 31 in the vertical direction is varied, and by rotating the first substrate 33 around the Y-axis with the beams 34a, 34b, the resonant frequency of the first substrate 33 in the horizontal direction is varied. Further, in the present embodiment, the mirror section 31 corresponds to a high-speed scanner, and the first substrate 33 corresponds to a low-speed scanner.

The high-speed scanner 31 rotates at a predetermined resonant frequency. Further, the laser bean emitted from the light source 10 is scanned from the upper end 40a of the screen 40 to the lower end 40b thereof by the high-speed scanner 31, and scanned from the left end 40c of the screen 40 to the right end 40d thereof by the low-speed scanner 33 as shown in FIG. 1. Thus, the scanning image display 2 scans the laser beam from the left end 40c of the screen 40 to the center section 40e thereof, and the scanning image display 3 scans a laser beam from the center section 40e of the screen 40 to the right end 40d thereof.

The laser beam emitted from the light source 10 is scanned by the high-speed scanner 31 from the upper end 40a of the screen 40 to the lower end 40b of the screen 40, and then from the lower end 40b to the upper end 40a. Thus a frame of image is displayed on the screen 40 with the 600 scan lines. Further, the laser beam emitted from the light source 10 is scanned beyond the upper end 40a and the lower end 40b of the screen 40 as shown in FIG. 1. This is because the scan speed of the MEMS mirror 30, which is a resonant mirror, is lowered when the laser beam turns at the upper side and the lower side, and the image is created so that the area beyond the edges of the screen 40, on which the laser beam scanned in low speed is entered, should not be displayed on the screen.

Figure 3A:
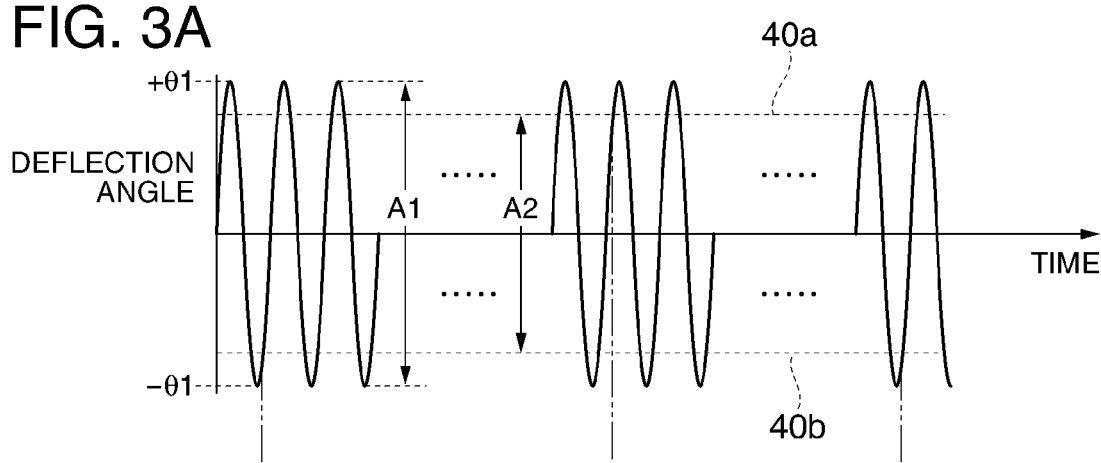
FIGS. 3A and 3B are diagrams showing a deflection angle of the MEMS mirror shown in FIG. 2.

As shown in FIG. 3A, the deflection angle of the high-speed scanner 31 varies from $+\theta1$ to $-\theta1$, and the laser beam entering the high-speed scanner 31 is scanned up to the positions beyond the upper end 40a or the lower end 40b of the screen 40. Specifically, when the deflection angle is $+\theta1$, the laser beam is scanned at the position beyond the upper end 40a of the screen 40, and when the deflection angle is $-\theta1$, the laser beam is scanned at the position beyond the lower end 40b of the screen 40.

The high-speed scanner 31 is driven at a drive frequency following the resonant frequency corresponding to the duration of the laser beam entering the MEMS mirror 30. Further, the high-speed scanner 31 is feedback-controlled so that the amplitude of the deflection angle of the high-speed scanner 31 remains constant. It should be noted that the deflection angle of the high-speed scanner 31 is controlled in the present embodiment so that an imaging period aperture ratio (the ratio of the image formation area A2 to the irradiation area A1 in each horizontal scanning period, A2/A1) is kept to be 0.9.

Figure 3B:
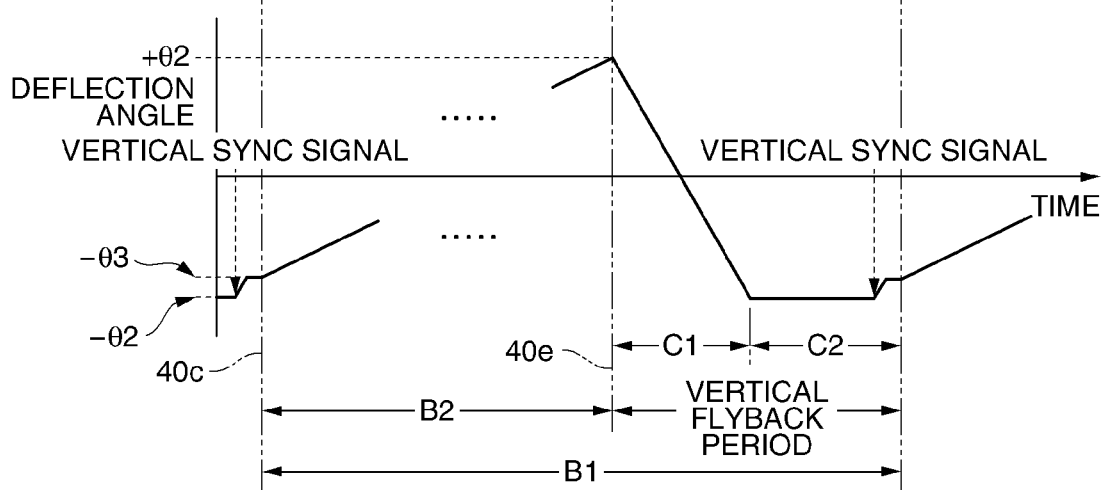

As shown in FIG. 3B, the deflection angle of the low-speed scanner 33 varies from $-\theta2$ through $-\theta3$ to $+\theta2$, and the laser beam entering the low-speed scanner 33 is scanned from the left end 40c of the screen 40 to the center part 40e thereof. Specifically, when the deflection angle is $-\theta3$, scanning of the laser beam starts on the left end 40c side of the screen 40, then the deflection angle increases gradually, and when the deflection angle reaches $+\theta2$, the laser beam is scanned up to the center part 40e of the screen 40. Then, after the deflection angle reaches $+\theta2$, the deflection angle decreases to $-\theta2$. When the deflection angle returns from $+\theta2$ to $-\theta2$, the light source 10 is in configured to be in an off state or the laser beam is blocked so that no image is displayed on the screen 40. The period during which the deflection angle of the low-speed scanner 33 returns from $+\theta2$ to $-\theta2$ corresponds to an actual vertical reset period C1.

Then, the low-speed scanner 33 waits (with the deflection angle of $-\theta2$) for input of a vertical sync signal (a first direction sync signal). The vertical sync signal causes the scan start timing of the high-speed scanners 31 of the two scanning image displays 2 and 3 be sync with each other.

When the vertical sync signal is input to the low-speed scanner 33, the deflection angle $\theta$ is gradually increased, and after the deflection angle $\theta$ reaches the scan start angular position (with the deflection angle of $-\theta3$), the low-speed scanner 33 is placed in a standby state. Then low-speed scanner 33, after staying in the standby state, the low-speed scanner 33 starts scanning at the same scan start time as the high-speed scanner 31 starts scanning the laser beam on the screen 40. Further, the scan position of the light beam emitted from the light source 10 is controlled by the low-speed scanner 33 so that the laser beam entering the high-speed scanner 31 is scanned outside the screen 40 after the scanning of one frame ended.

The period between when the deflection angle of the low-speed scanner 33 is $-\theta2$ to when the scanning starts corresponds to a standby period C2. The period obtained by combining the actual vertical reset period and the standby period corresponds to the vertical reset period (C1+C2, a second direction reset period).

Next, the control of the resonant frequency of the MEMS mirror 30 will be explained.

The MEMS mirror 30 is heated by the laser beam emitted from the light source 10. Further, the heating of the MEMS mirror 30 occurs when the low-speed scanner 33 is in the standby period (C2). The amount that the high-speed scanner 31 is heated is determined in accordance with an actual imaging time (the time during which the MEMS mirror 30 is irradiated with the laser beam, i.e., the time during which an image is formed on the screen 40) to the frame period. In other words, the amount is determined so that the ratio of the actual imaging time is equal to or greater than a predetermined value. Specifically, the duration of the laser beam emitted from the light source 10 in the standby period (C2) is controlled so that the value obtained by multiplying the imaging period aperture ratio (A2/A1) of the high-speed scanner 31 by the ratio of the actual imaging time for forming the image in the imaging area duration (B2) to the frame period (B1) becomes equal to or greater than a predetermined value. In one example, the predetermined value is 75%, although any number of values may be used.

Here, assuming that the actual vertical reset period is 1.6 ms, the maximum period of forming the image on the screen 40 is 15 ms, the ratio of the actual imaging time to the frame period first exceeds 75% when the actual imaging time is 13.9 ms. Therefore, in order to prevent the ratio of the actual imaging time from becoming lower than 75%, the actual imaging time is constantly measured.

Figure 4A:
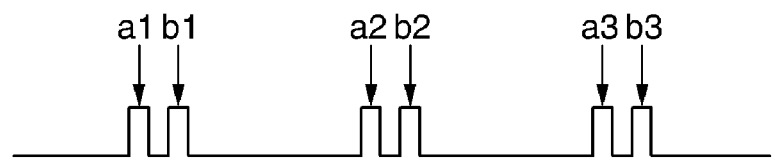
FIGS. 4A and 4B are schematic diagrams showing a sensing procedure used for the scanning image display system.
Figure 4B:
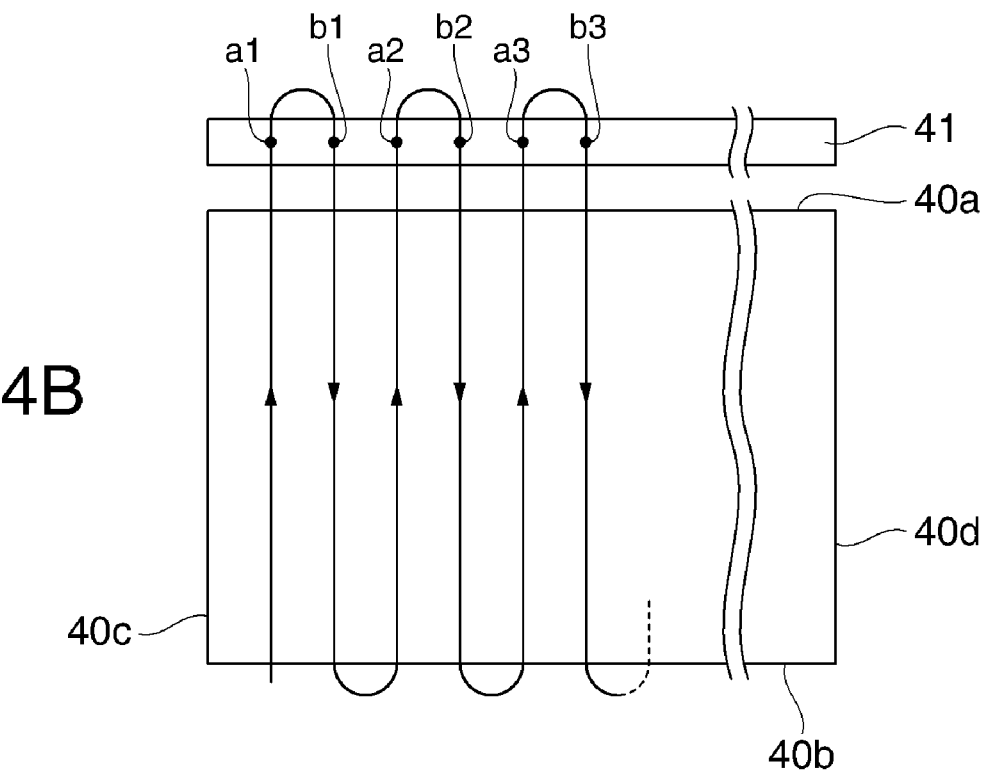

In order to measure the actual imaging time, a photo diode 41 shaped like a line is disposed on the upper end 40a side of the screen 40 as shown in FIG. 4B.

The photo diode 41 is for detecting when the 600 laser beams scanned beyond the upper end 40a of the screen 40, and detecting the laser beams moving from the lower end 40b of the screen 40 towards the upper end 40a thereof at points a1, a2, a3, . . . and the laser beams moving from the upper end 40a of the screen 40 towards the lower end 40b thereof at points b1, b2, b3 . . . . Further, as the laser beam is scanned outside the screen 40, the red light source 10R is lighted. It should be noted that the laser beam scanned outside the screen 40 is not limited to the red light, and a green laser beam, blue laser beam, or mixed color laser beam may also be adopted.

Further, the signal detected at positions a1, a2, a3, . . . b1, b2, b3, . . . , shows the highest light intensity when the laser beam thus scanned passes through the photo diode as shown in FIG. 4A. Further, by counting the number of clock pulses generated between the positions a1 and a2 and the number of clock pulses generated between the positions a2 and a3 and the like, the actual imaging time can be calculated. If the actual imaging time is shorter than 14.3 ms, the laser beam is emitted from the light source 10 in the standby period (C2) in proportion to the difference to heat the MEMS mirror 30. Further, if the drive frequency of the high-speed scanner 31 is shifted in the actual imaging time, the low-speed scanner 33 varies the drive frequency to as to correspond to the shift in the high-speed scanner.

Further, the time for which the MEMS mirror 30 forms the image on the screen 40 is 13 ms. 5 ms (15 ms×0.9). Therefore, a MEMS mirror 30 which has a resonant frequency equal to or higher than the drive frequency necessary to image one frame when the laser beam with the maximum luminance is applied to the high-speed scanner 31 for 13.5 ms. It should be noted that in the present embodiment, a MEMS mirror is used with a resonant frequency equal to or higher than 20 kHz, which can scan 600 or more scan lines on the screen 40 in 15 ms. Further, when the laser beam with the maximum luminance is used, the resonant frequency becomes the lowest, and heating is not necessary, meaning that the standby period (C2) becomes 0s.

Next, a method of displaying an image on the screen 40 with the scanning image display system 1 according to the present embodiment thus configured will now be explained.

Firstly, the light source 10 of each of the scanning image displays 2 and 3 emits the red laser beam, the green laser beam, and the blue laser beam based on a video signal. Further, the green light source 10G emits the green light beam which passes through the AOM 11 in order to generate an output corresponding to a signal supplied to the AOM 11.

The red laser beam, the green laser beam, and the blue laser beam are emitted respectively from the light source devices 10R, 10G, and 10B are combined by the cross dichroic prism 20, and then enter the MEMS mirror 30. The laser beams entering the MEMS mirror 30 are scanned (in the vertical direction) on the screen starting at the upper end 40a of the screen 40 towards the lower end 40b, or from the lower end 40b towards the upper end 40a by rotating the high-speed scanner 31 of the MEMS mirror 30 around the X-axis thereof. Further, by the rotation of the low-speed scanner 33 around the Y-axis, the laser beams are scanned (in the horizontal direction) from the left end 40c of the screen 40 towards the center part 40e thereof. Thus, an image is displayed on the screen 40.

Here, the laser beam is emitted from the light source 10 to the MEMS mirror 30 having the actual imaging time, which is calculated based on the number of clock pulses detected using the photo diode 41, shorter than 14.3 ms, thus the MEMS mirror 30 is heated. The MEMS mirror 30 thus heated is lowered in resonant frequency by the heat accumulation, and rotates slowly. As described above, the duration of time that the laser beam is emitted from the light source 10 in the standby period is controlled so that the resonant frequency of each of the MEMS mirrors 30 becomes equal to or lower than the predetermined value. Thus, the resonant frequency of the MEMS mirror 30 is controlled, and the scan rate of the high-speed scanner 31 is adjusted.

As described above, in the scanning image display system 1 according to the present embodiment, the resonant frequency of the MEMS mirror 30 of each of the scanning image displays 2 and 3 can be prevented from increasing beyond a predetermined value. Thus, since the scan rates of the two MEMS mirrors 30 of the respective scanning image display devices 2 and 3 can be made substantially the same, it becomes possible to prevent dropped frame and flickers which may otherwise be generated, and thus resulting in a crisp image on the screen 40.

Further, since the high-speed scanner 31 is heated by the laser beam emitted from the light source 10, there is no need for increasing the number of components, and therefore, it becomes possible to achieve downsizing and cost reduction of the entire system. Further, since the duration of heating the high-speed scanner 31 is determined in accordance with the actual imaging time of each of the scanning image displays 2 and 3, it is possible to synchronize the high-speed scanners 31 of the respective scanning image displays 2 and 3.

Further, since the high-speed scanner 31 is heated during the standby period (C2), it is possible to control the resonant frequency of the high-speed scanner 31 without impacting the image displayed on the screen 40. Still further, since the resonant frequency of the high-speed scanner 31 to which the laser beam with the maximum luminance is input is equal to or higher than the drive frequency necessary for imaging one frame, even if the high-speed scanner 31 is heated to a maximum point, it is possible to prevent any frames from being dropped. Further, since the high-speed scanner 31 is heated so that the value obtained by multiplying the imaging period aperture ratio (A2/A1) of the high-speed scanner 31 by the ratio of the actual imaging time for forming the image in the imaging area duration (B2) to the frame period (B1) becomes equal to or greater than 75%, the scan rate of the high-speed scanner 31 can be set to be lower than a predetermined value, thus the flicker can more effectively be prevented from occurring.

Further, the start timing of the laser beam scanned by the low-speed scanner 33 on the screen 40 is controlled by controlling the scanning position of the light beam emitted from the light source 10 so any light beam entering the high-speed scanner 31 is not scanned on the screen 40 after the scanning of one frame ended. Thus, since the timing at which the scanning image display 2 starts imaging and the timing at which the scanning image display 3 starts imaging can be synchronized, making it possible to display a crisp image on the screen 40.

It should be noted that the output intensity of the laser beam emitted from the light source 10 during the standby period (C2) can exceed the upper limit of the output in the imaging area of the screen 40. Further, it is also possible to calculate the actual imaging time by the number of the clock pulses generated between the points b2 and b3. Still further, although it is arranged that the mirror section 31 is heated when the actual imaging time becomes shorter than 14.3 ms in order to ensure that the actual imaging time is not shorter than 13.9 ms, the time value is illustrative only and may be modified without departing from the scope of the invention.

Further, although the high-speed scanner 31 is heated during the standby period (C2) of the vertical reset period, it is also possible to heat the high-speed scanner 31 in the horizontal reset period (a second direction reset period) when the image is formed by only one way scanning of the laser beam on the screen 40 (e.g., scanning from the upper end 40a of the screen 40 towards the lower end 40b thereof) in contrast to the present embodiment.

Second Embodiment

A second embodiment according to the invention will now be explained with reference to FIG. 5. It should be noted that in the drawing of each of the embodiments described hereinafter, portions with configurations common to the scanning image display system 1 as described in the first embodiment above will be denoted with the same reference numerals, and the explanations thereof will be omitted.

A scanning image display system 50 according to the present embodiment is different from that of the first embodiment in that an auxiliary light source device 60 for heating the MEMS mirror 30 is provided in addition to the light source 10. Otherwise, the scanning image display system 50 is the same as that of the first embodiment in the other configurations.

Figure 5:
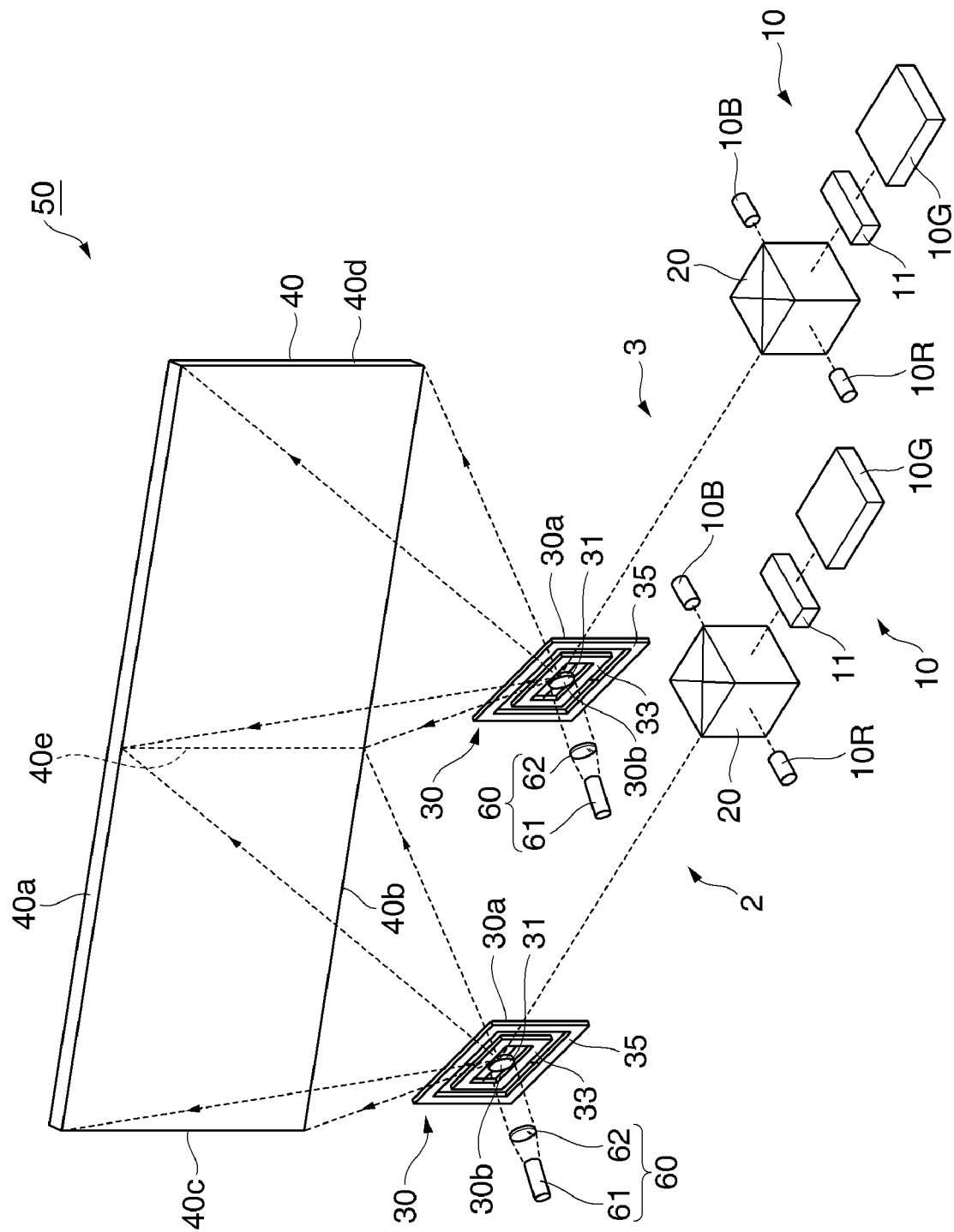
FIG. 5 is a perspective view showing a scanning image display system according to a second embodiment of the invention.

As shown in FIG. 5, the auxiliary light source device (another light source) 60 is provided with a light source 61 and a collimator lens 62, and is disposed on the side of the reverse surface (the opposite surface to the reflecting surface) 30b opposite to the obverse surface (the reflecting surface) 30a of the MEMS mirror 30 to which the laser beam emitted from the cross dichroic prism 20 in input.

The light source 61 emits visible light with a center wavelength of 620 nm. Further, the collimator lens 62 converts the light emitted from the light source 61 into collimated light, and receives the collimated light from the reverse surface 30b of the MEMS mirror 30. In this case, the reverse surface 30b of the MEMS mirror 30 is not required to have high reflectivity although the obverse surface 30a thereof is required to have high reflectivity, and therefore, is preferably made of a material with low reflectivity. Thus, it becomes possible to increase the light absorptivity of the reverse surface 30b of the MEMS mirror 30, thus efficiently absorbing the light emitted from the auxiliary light source device 60.

The present embodiment is effective when the resonant frequency of the high-speed scanner 31 cannot sufficiently be limited to a desired value in accordance to the amount of accumulated heat of the high-speed scanner 31 caused by the laser beam emitted from the light source 10. In other words, the auxiliary light source device 60 heats the high-speed scanner 31 when the high-speed scanner 31 cannot sufficiently be heated with the output intensity of the light emitted from the light source 10.

Further, the heat used to adjust the resonant frequency of the MEMS mirror 30 is applied during the standby period of the low-speed scanner 33 as in the case with the first embodiment. It should be noted that since the light for heating the MEMS mirror 30 from the reverse surface 30b thereof, the light emitted from the auxiliary light source device 60 exerts no influence on the image displayed on the screen 40. Therefore, it is possible to emit the light necessary to heat the MEMS mirror 30 from the auxiliary light source device 60 in the actual vertical reset period or the actual imaging time.

According to the configuration described above, the scanning image display system 50 according to the present embodiment can obtain substantially the same advantage as in the scanning image display system 1 of the first embodiment. Further, since the scanning image display system 50 according to the present embodiment is provided with the auxiliary light source device 60, and it is possible to heat the high-speed scanner 31 with the light source 10 and the auxiliary light source device 60, the scanning image display system 50 may be used when an amount of heat generated by the light source 10 alone is not sufficient to adequately heat the MEMS mirror 30. In other words, when the resonant frequency of the high-speed scanner 31 cannot reach the desired value using only the accumulated heat caused by the laser beam emitted from the light source 10, the resonant frequency of the high-speed scanner 31 can be adjusted by heating the high-speed scanner 31 with the auxiliary light source device 60.

Further, since the light emitted from the auxiliary light source device 60 is received from the reverse surface 30b of the MEMS mirror 30, it is possible to heat the high-speed scanner 31 not only during the standby period but also during the actual vertical reset period or the actual imaging time unlike in the case of the first embodiment. Therefore, it becomes possible to efficiently adjust the resonant frequency of the high-speed scanner 31.

It should be noted that although it is arranged that the light is emitted from the auxiliary light source device 60 when the desired resonant frequency of the high-speed scanner 31 achieved using only the heat supplied from the light source 10, it is also possible to perform the heating process using only by the auxiliary light source device 60.

Further, although an auxiliary light source device 60 emitting red light is used, the wavelength of the light emitted from the auxiliary light source device 60 is not limited to 620 nm. Further, since the light is applied to the reverse surface 30b of the MEMS mirror 30, and therefore, exerts no influence on the image displayed on the screen 40, visible light with any color can be adopted. In other words, according to the present embodiment, it becomes possible to expand the range of choices for the wavelength of the light entering the MEMS mirror 30.

Further, using the auxiliary light source device outputting infrared light or an infrared laser beam in order to reliably prevent the light emitted from the auxiliary light source device 60 from exerting an influence on the image displayed on the screen 40, the auxiliary light source 60 can be prevented from being displayed on the screen 40. Therefore, it becomes possible to display a crisp image on the screen 40.

Third Embodiment

A third embodiment according to the invention will now be explained with reference to FIG. 6.

A scanning image display system 70 according to the present embodiment is different from that of the first embodiment in the position of an auxiliary light source device 71 and in that the light emitted from the auxiliary light source device 71 is infrared light. The scanning image display system 70 is the same as that of the second embodiment in the other configurations.

Figure 6:
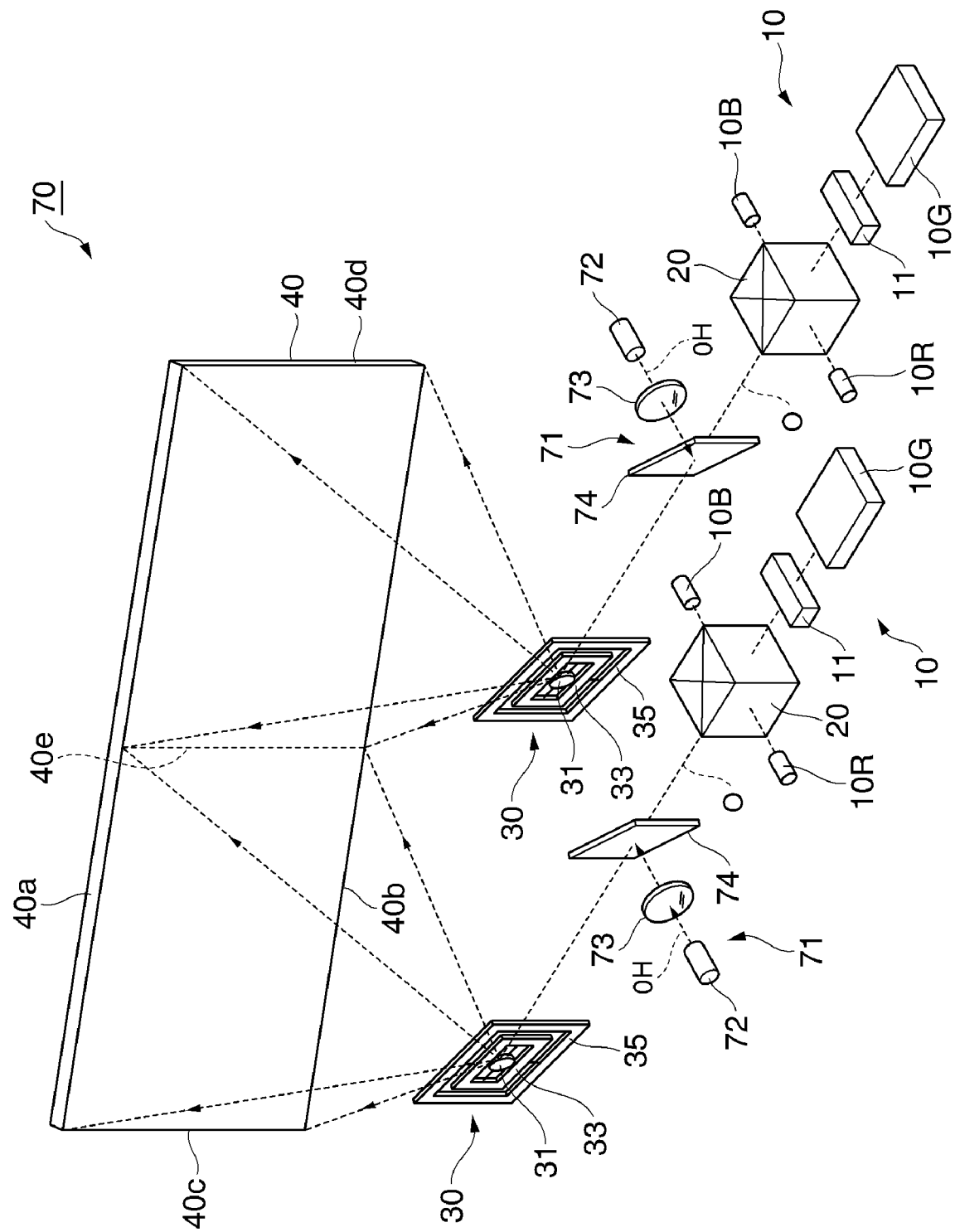
FIG. 6 is a perspective view showing a scanning image display system according to a third embodiment of the invention.

As shown in FIG. 6, the auxiliary light source device 71 is provided with a light emitting diode (LED) 72 for emitting infrared light with a center wavelength of 920 nm, a collimator lens 73, and a dichroic mirror 74.

The dichroic mirror 74 is for transmitting the light (visible light) emitted from the cross dichroic prism 20, and reflecting the light (invisible light) emitted from the LED 72. The dichroic mirror 74 is disposed on the light path between the cross dichroic prism 20 and the MEMS mirror 30 at an angle of 45° with the center axis O of the laser beam emitted from the cross dichroic prism 20. Further, the center axis OH of the infrared light emitted from the LED 72 is perpendicular to the center axis O, and the infrared light emitted from the LED 72 enters the dichroic mirror 74 at an angle of 45° with the dichroic mirror 74. Thus, the infrared light emitted from the LED 72 and then converted by the collimator lens 73 into collimated light enters the dichroic mirror 74, and is reflected on the center axis O of the laser beam emitted from the cross dichroic prism 20.

Further, the heating process for adjusting the resonant frequency of the MEMS mirror 30 is substantially the same as in the second embodiment.

According to the configuration described above, since in the scanning image display system 70 according to the present embodiment, the auxiliary light source device 71 emits infrared light, it is possible to heat the high-speed scanner 31 not only during the standby period but also in the actual vertical reset period or the actual imaging time similarly as in the scanning image display system 50 of the second embodiment. Further, in the scanning image display system 70 of the present embodiment, since the auxiliary light source device 71 emits the infrared light, even if the light emitted from the auxiliary light source device 71 enters the MEMS mirror 30, there is no chance for the light to exert an influence on the image displayed on the screen 40. Therefore, it is possible to display a crisp image on the screen 40.

It should be noted that although it is arranged so that the light path of the laser beam emitted from the cross dichroic prism 20 and the light path of the light emitted from the auxiliary light source device 71 are coaxial, it is also possible to input the laser beam and the light emitted from the auxiliary light source device 71 to the MEMS mirror 30 separately from each other. Further, although the LED 72 is used as the light source for emitting the infrared light, it is also possible to adopt another light source for emitting an infrared laser beam.

Further, although the auxiliary light source device 71 for emitting the infrared light as the invisible light is used, this is not a limitation, and an auxiliary light source device for emitting ultraviolet light can also be used, for example.

Fourth Embodiment

A fourth embodiment according to the invention will now be explained with reference to FIG. 7.

Figure 7:
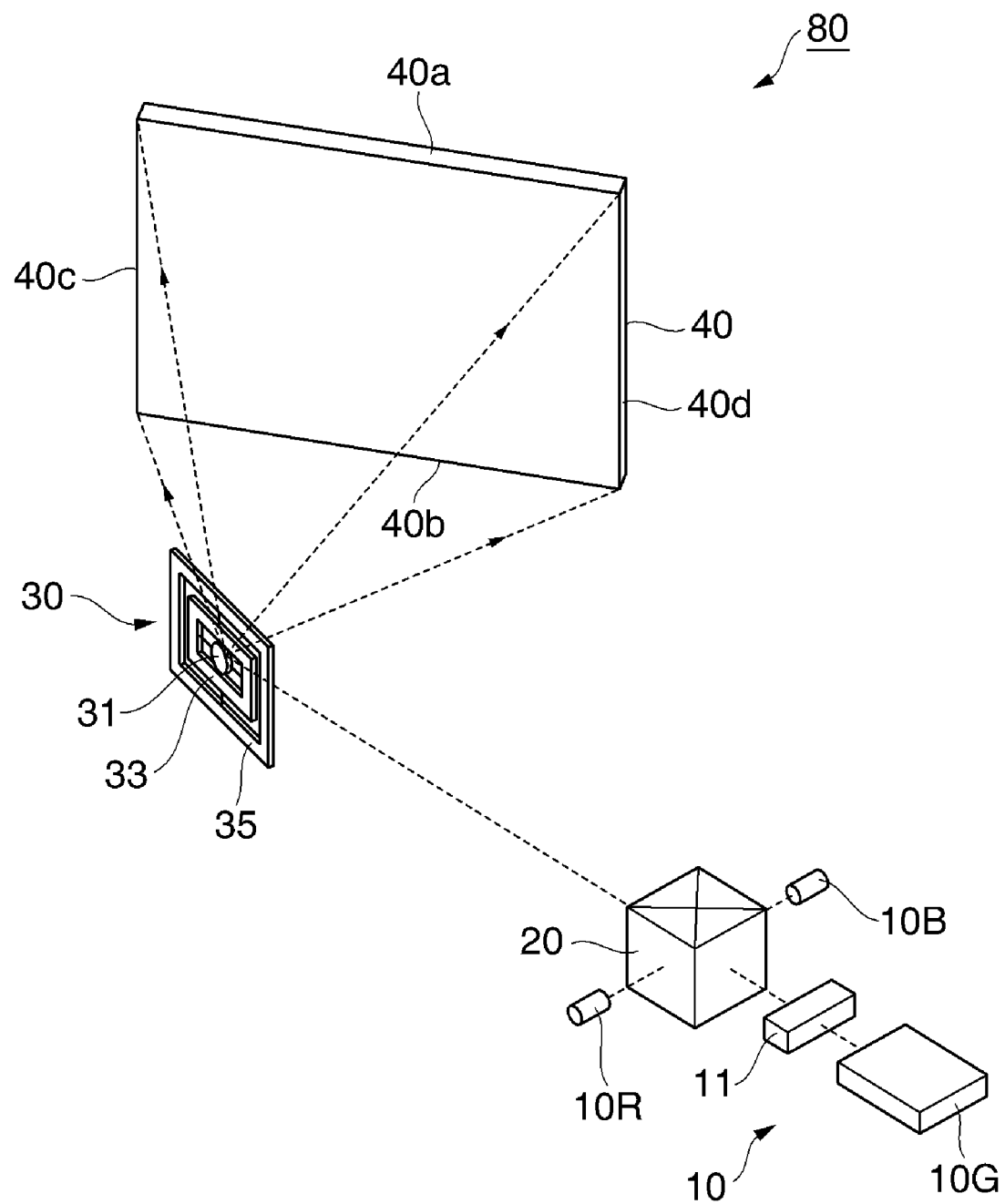
FIG. 7 is a perspective view showing a scanning image display according to a fourth embodiment of the invention.

As shown in FIG. 7, the scanning image display 80 according to the present embodiment is a device provided with the light source 10, the cross dichroic prism 20, and the MEMS mirror 30 similar to the scanning image display 2, which are adapted to display an image by scanning a laser beam entering the MEMS mirror 30 towards the screen 40.

Similarly to the scanning image display system 1 described above, the scanning image display 80 also heats the MEMS mirror 30 during the standby period in the case when the imaging time is shorter than a predetermined time and the amount of accumulated heat of the high-speed scanner 31 is small.

The scanning image display 80 according to the present embodiment can make the resonant frequency of the high-speed scanner 31 lower than a predetermined resonant frequency by heating the MEMS mirror 30. Thus, since the flicker can be prevented from occurring, it becomes possible to project a crisp image on a projection surface.

It should be noted that the scope of the invention is not limited to the embodiments described above, but various modifications can be executed thereon within the scope or the spirit of the invention.

For example, although the cross dichroic prism is used as a colored light composition section, the colored light composition section is not limited thereto. Dichroic mirrors in a cross arrangement may be used to combine the colored light beams, or dichroic mirrors may be arranged in parallel to each other to combine the colored light beams, and so on can be used as the colored light composition section.

Further, although the MEMS mirrors are used as scan sections, the scan sections are not limited thereto, and resonant galvanometer mirrors or other mirrors may also be adopted.

Further, although the duration of heating the high-speed scanner is determined in accordance with the imaging time, this is not a limitation, but it is also possible to provide the MEMS mirror with a temperature sensor to determine the heating duration of the MEMS mirror based on the temperature thus detected.

Further, although the duration of the laser beam emitted from the light source during the standby period is controlled to adjust the resonant frequency of the high-speed scanner, it is also possible to control the output intensity of the laser beam incident to each of the MEMS mirrors and to irradiate the all MEMS mirrors with the light for a constant period of time.

Still further, although the MEMS mirror described herein includes both a low-speed scanner (the second scan section) and the high-speed scanner (the first scan section), it is also possible to provide the low-speed scanner and the high-speed scanner which are formed separately from each other. In this configuration, substantially the same advantage can be obtained by emitting the light from the light source to the high-speed scanner to heat the high-speed scanner during the standby period of the low-speed scanner. Further, in the case in which the low-speed scanner and the high-speed scanner are provided separately, only the high-speed scanner is required to be a resonant scan section.

What is claimed is:

1. A scanning image display system comprising:
a plurality of scanning image displays each including:
a light source adapted to emit a laser beam; and
a scan unit having a first scan section comprising resonant scan sections capable of scanning the laser beam emitted from the light source in a first direction on a projection surface and a second scan section capable of scanning the laser beam in a second direction substantially perpendicular to the first direction, the first scan section being capable of scanning faster than the second scan section;
wherein the first scan sections are heated with light in order to control the resonant frequencies of the first scan sections during at least a part of the period of time comprising an image forming period and a reset period of the second scan sections.

2. The scanning image display system according to claim 1, wherein the first scan sections are heated with the laser beam emitted from the light source.

3. The scanning image display system according to claim 1, wherein the amount that the first scan section is heated is determined in accordance to the length of time that the laser beam is scanned on the projection surface by the scan unit.

4. The scanning image display system according to claim 1, wherein the first scan sections are heated using at least a part of the reset period.

5. The scanning image display system according to claim 1, wherein the resonant frequency of the first scan section provided with the laser beam at a maximum luminance is higher than a drive frequency necessary for imaging one frame.

6. The scanning image display system according to claim 1, wherein the first scan sections are heated so that a ratio of an actual imaging time to a period of one frame becomes equal to or greater than a predetermined value.

7. The scanning image display system according to claim 6, wherein the ratio of the actual imaging time to the period of one frame is equal to or greater than 75%.

8. The scanning image display system according to claim 1, wherein the second scan section controls the start timing of the laser beam scanned on the projection surface.

9. The scanning image display system according to claim 1, wherein the scan position of the laser beam emitted from the light source is controlled by the second scan section so that the laser beam entering the first scan section is scanned outside the projection surface according to a first direction sync signal which is capable of synchronizing the scan of the laser beam in the first direction between the plurality of scanning image displays.

10. The scanning image display system according to claim 1, further comprising:
an additional light source;
wherein the first scan sections are heated by light emitted from the additional light source.

11. The scanning image display system according to claim 10, wherein the light emitted from the additional light source enters the opposite surface of the first scan section from the surface of the first scan section where the light emitted from the light source enters.

12. The scanning image display system according to claim 10, wherein the light emitted from the additional light source is invisible light.

13. The scanning image display system according to claim 1, wherein the first scan section is an MEMS mirror.

14. A scanning image display comprising:
a light source adapted to emit a laser beam; and a scan unit comprising:
a first scan section comprising a resonant scan section with is capable of scanning the laser beam emitted from the light source in a first direction on a projection surface, and
a second scan section capable of scanning the laser beam in a second direction substantially perpendicular to the first direction, the first scan section being capable of scanning faster than the second scan section,
wherein the first scan section is heated with light during at least a part of the period of time that the scanning is being performed by the second scan section and a reset period when scanning is not being performed by the second scan section so as to control the resonant frequency of the first scan section.

15. A scan unit comprising:
a first scan section comprising resonant scan sections capable of scanning a laser beam emitted from a light source in a first direction on a projection surface; and
a second scan section capable of scanning the laser beam in a second direction substantially perpendicular to the first direction, the first scan section being capable of scanning faster than the second scan section,
wherein the first scan sections are heated with light in order to control the resonant frequencies of the first scan sections during at least a part of the period of time comprising an image forming period and a reset period of the second scan section.

16. The scan unit according to claim 15, wherein the first scan section is heated with the laser beam emitted from the light source.

17. The scan unit according to claim 15, wherein the amount that the first scan section is heated is determined in accordance to the length of time that the laser beam is scanned on the projection surface by the scan unit.

18. The scan unit according to claim 15, wherein the resonant frequency of the first scan section provided with the laser beam at a maximum luminance is higher than a drive frequency necessary for imaging one frame.

19. The scan unit according to claim 15, wherein the first scan section is heated so that a ratio of an actual imaging time to a period of one frame becomes equal to or greater than a predetermined value.

* * * * *